United States Patent
Saini et al.

(10) Patent No.: US 11,645,349 B2
(45) Date of Patent: May 9, 2023

(54) GENERATING LOCATION BASED PHOTO DISCOVERY SUGGESTIONS

(71) Applicant: Adobe Inc., San Jose, CA (US)

(72) Inventors: Sachin Kumar Saini, Greater Noida (IN); Roshan Singh, Greater Noida West (IN); Ankur Murarka, Bangalore (IN)

(73) Assignee: Adobe Inc., San Jose, CA (US)

(*) Notice: Subject to any disclaimer, the term of this patent is extended or adjusted under 35 U.S.C. 154(b) by 8 days.

(21) Appl. No.: 17/023,196

(22) Filed: Sep. 16, 2020

(65) Prior Publication Data
US 2022/0083619 A1  Mar. 17, 2022

(51) Int. Cl.
| G06F 16/9537 | (2019.01) |
| --- | --- |
| H04N 5/232 | (2006.01) |
| H04W 4/021 | (2018.01) |
| G06F 16/9535 | (2019.01) |
| G06F 16/9536 | (2019.01) |
| G06V 20/20 | (2022.01) |
| G06K 9/00 | (2022.01) |
| G06F 16/9538 | (2019.01) |

(52) U.S. Cl.
CPC ...... *G06F 16/9537* (2019.01); *G06F 16/9535* (2019.01); *G06F 16/9536* (2019.01); *G06F 16/9538* (2019.01); *G06K 9/00* (2013.01); *H04N 5/23222* (2013.01); *H04W 4/021* (2013.01); *G06V 20/20* (2022.01)

(58) Field of Classification Search
CPC .......... G06F 16/9537; G06F 16/9535; G06F 16/9536; G06F 16/9538; H04N 5/23222; G06K 9/00671; G06K 9/00; H04W 4/021; G06V 20/20
See application file for complete search history.

(56) References Cited

U.S. PATENT DOCUMENTS

| | | | | |
| --- | --- | --- | --- | --- |
| 9,014,726 | B1 * | 4/2015 | Foster | H04W 4/021 455/418 |
| 2003/0026608 | A1 * | 2/2003 | Malloy Desormeaux | H04N 5/23222 396/281 |
| 2004/0174434 | A1 * | 9/2004 | Walker | H04N 1/32128 348/211.3 |
| 2013/0273968 | A1 * | 10/2013 | Rhoads | H04W 4/50 455/556.1 |
| 2014/0193047 | A1 * | 7/2014 | Grosz | G06Q 10/10 382/118 |

(Continued)

*Primary Examiner* — Kris E Mackes
*Assistant Examiner* — Lin Lin M Htay
(74) *Attorney, Agent, or Firm* — FIG. 1 Patents

(57) ABSTRACT

Techniques and systems are described for generating location based photo discovery suggestions. Generally, photo discovery data is generated and utilized to form discovery suggestions that identify suggested locations for capturing photographs, as well as other capture-related information that is presented to assist a user in capturing photographs of interest to the user. A discovery suggestion, for example, not only identifies a location of potential photographic interest to a user, but also includes information such as camera settings and suggested camera equipment for capturing photos at the location. A discovery suggestion thus guides a user as to how to maximize a likelihood that a digital image captured by the user includes subject matter of interest to the user and is also visually pleasing.

20 Claims, 12 Drawing Sheets

(56) References Cited

U.S. PATENT DOCUMENTS

2014/0222809 A1\* 8/2014 Hochmuth ............. G06F 16/29
                                                                               707/736

\* cited by examiner

GENERATING LOCATION BASED PHOTO DISCOVERY SUGGESTIONS

BACKGROUND

Digital image generation has become an increasing part of a user's everyday life as a direct result of exposure to a wide range of devices that include this functionality. This includes dedicated image capture devices as well as image capture devices incorporated as part of mobile phones, tablets, personal computers, and so forth.

Conventional digital image capture techniques, however, typically rely on expertise of the user to capture visually pleasing images. A user, for instance, is confronted with a variety of tasks as part of initiating capture of a digital image by an image capture device. Examples of these tasks include selecting an image scene that is to be a subject of the digital image as well as how that digital image is to be captured, e.g., how to frame an object in the image scene, which camera equipment to utilize, which camera settings to utilize, and so forth. While this gives a sophisticated user a variety of creative opportunities, a user that does not have these expertise is confronted with significant challenges. As a result, these conventional techniques tend to be frustrating to the average user and result in lower quality images being taken due to the user's inability to take advantage of the sophisticated options.

Accordingly, a user attempting to capture a desired image of a particular subject (e.g., a scene at a geographical location) often resorts to capturing many different images from different perspectives and using different image capture settings. Further, even with a variety of different captured images, the user often will not obtain a desired perspective and visual appearance. To remedy this, the user has the option to attempt a variety of post-capture processing actions on different captured images, such as to edit different visual attributes of the images. Thus, conventional digital image capture techniques not only cause user frustration, but waste device and system resources utilized to capture, store, and edit digital images.

SUMMARY

Techniques and systems are described for generating location based photo discovery suggestions. Generally, photo discovery data is generated and utilized to form discovery suggestions that identify suggested locations for capturing photographs, as well as other capture-related information that is presented to assist a user in capturing photographs of interest to the user. A discovery suggestion, for example, not only identifies a location of potential photographic interest to a user, but also includes information such as camera settings and suggested camera equipment for capturing photos at the location. A discovery suggestion thus guides a user as to how to maximize a likelihood that a digital image captured by the user includes subject matter of interest to the user and is also visually pleasing.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus are referenced interchangeably in single or plural forms of the entities in the discussion.

DETAILED DESCRIPTION

Overview

Figure 1:
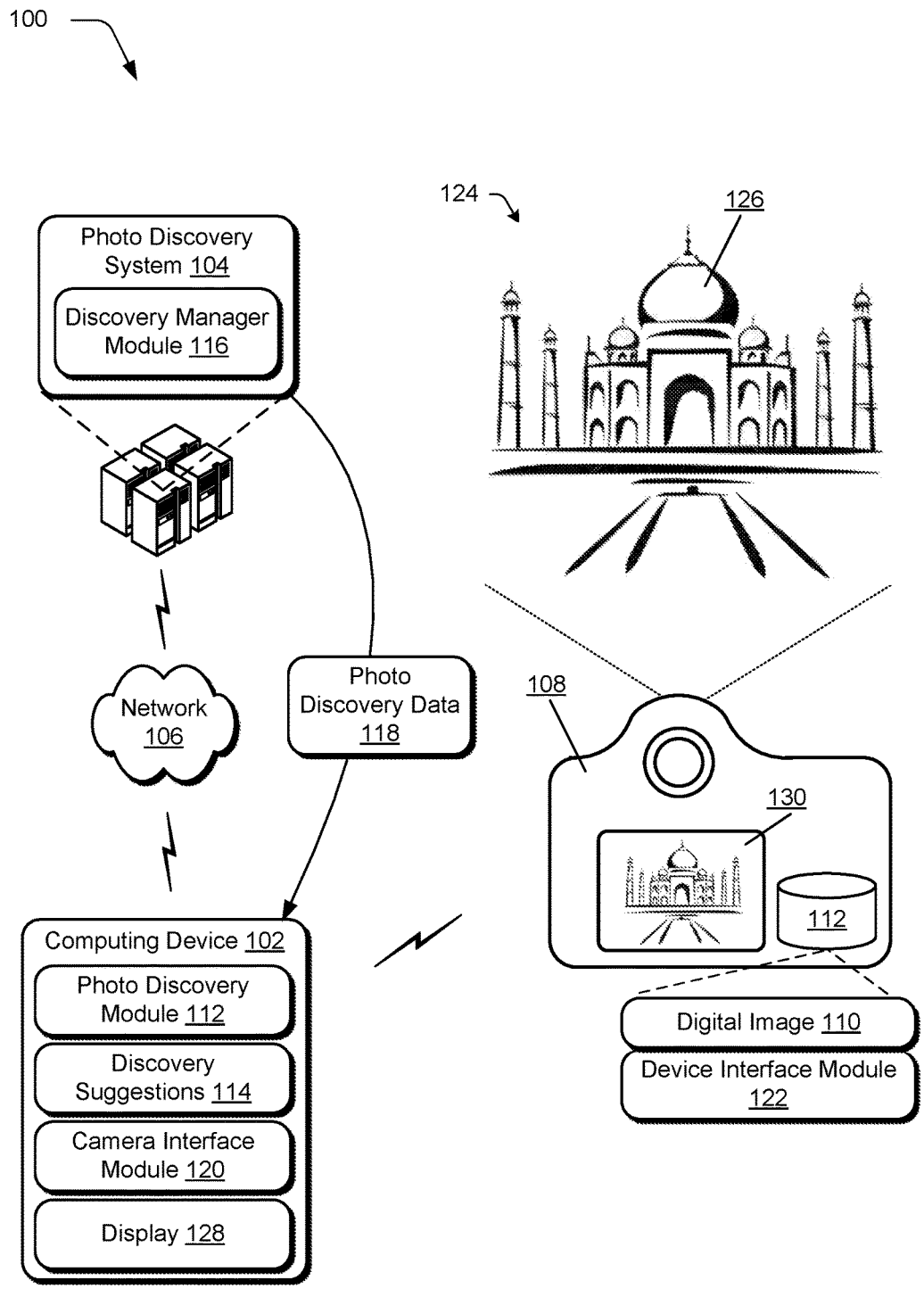
FIG. 1 is an illustration of an environment in an example implementation that is operable to employ generating location based photo discovery suggestions described herein.

Millions of digital images are captured by users of image capture devices every day. Conventional techniques to capture digital images, however, rely primarily on a user's expertise in order to capture digital images that are visually pleasing. Therefore, conventional techniques require the user to gain these expertise or obtain less than desirable results, which is frustrating, time intensive, and computationally inefficient.

Accordingly, generating location based photo discovery suggestions techniques and systems are described. In examples described in the following, photo discovery data is generated and utilized to form discovery suggestions that identify suggested locations for capturing photographs, as well as other capture-related information that is presented to assist a user in capturing photographs of interest to the user. A discovery suggestion, for example, not only identifies a location of potential photographic interest to a user, but also includes information such as camera settings and suggested camera equipment for capturing photos at the location. A discovery suggestion thus guides a user as to how to maximize a likelihood that a digital image captured by the user includes subject matter of interest to the user and is also visually pleasing.

Generally, photo discovery data for generating discovery suggestions is aggregated from source photos retrieved from a variety of different sources and captured by multiple different users. Each source photo, for example, includes data that describes attributes of the source photo, such as a user identifier of a user that captured the photo, a geographical location at which the photo was captured, camera settings utilized, camera equipment utilized. Further, the source photo data includes tags that describe visual attributes of the source photos, such as identifiers for visual objects included in the photos.

Accordingly, to generate discovery suggestions of potential interest to a user, a user location is determined and the source photos are aggregated into photo location clusters based on their proximity to the user location. Generally, the user location represents a current location of the user or a location of interest to the user, such as a planned future travel location identified by the user. A proximity region, for example, is defined around the user location and source photos captured within the proximity region are aggregated into the location clusters based on their proximity to one another. For instance, each location cluster includes multiple photographs captured at a similar location within the proximity region.

To further tailor discovery suggestions to a particular user, photos associated with an identity of the user (e.g., that are captured by the user) are aggregated and utilized to identify user style attributes. The user style attributes, for example, indicate typical attributes of user photos, such as camera settings utilized by the user, times of day that the user typically engages in photography, visual objects included in the user photos, and so forth. Thus, the user style attributes are used to characterize user photography preferences, such as visual objects that the user prefers to photograph and a user's preferred photography style(s), e.g., nature photography, portraits, action photography, macro photography, and so forth.

Accordingly, source photo data for the location clusters of source photos is compared to the user style attributes to determine a relative similarity of each of the location clusters to the user style attributes. For instance, a similarity score is generated for each location cluster that indicates a relative similarity of the location cluster to the user style attributes.

One example way for determining similarity of a location cluster to a set of user style attributes utilizes vector representation comparison. For instance, the user style attributes are converted into vector form to generate user photo vectors that each represent a different respective user style attribute. Source photo attributes from the source photo data for the location clusters are also converted into vector form to generate location photo vectors that each represent source photo attributes of source photos from the location clusters. The location photo vectors are then compared to the user photo vectors to determine a relative similarity of the location photo vectors to the user photo vectors. Generally, the vector comparison involves an attribute-to-attribute comparison between the location photo vectors and the user photo vectors to generate a similarity score for each location cluster.

To present location clusters to the user that are likely of most interest to the user, those location clusters with the highest similarity scores are presented as instances of discovery suggestions. For instance, the location clusters are ranked in descending order based on their respective similarity scores and a set of highest ranked location clusters are presented to the user. A graphical user interface, for example, is presented that includes cluster pins that each identify a respective location cluster from the highest ranked location clusters. The cluster pins generally represent icons that are selectable to expose information about a respective location cluster, such as a location identifier, a number of photos captured at the location, a most popular time for capturing photos at the location, popular camera settings, and so forth.

Thus, a user is able to obtain various photo discovery suggestions that are relevant not only to the user's location, but to photography-related user preferences. This conserves resources and improves photography-related device performance in a number of different ways. For instance, by identifying locations of potential interest to a user, the user avoids expending excessive travel time and resources to search for such locations. This not only conserves the user's time, but also conserves travel-related resources such as fuel (e.g., petrol, battery charge, etc.) utilized to transport the user between different locations. By reducing utilizing of such travel-related resources, environmental impact is also reduced. Still further, photo capture resources are conserved by providing discovery suggestions that increase a likelihood that a user will capture photos of interest with fewer photo captures than would be experienced without access to the discovery suggestions. Examples of such photo capture resources include camera battery, data storage used to store digital photos, network bandwidth utilized to communicate digital photos (e.g., to a remote data storage), and so forth.

Term Definitions

These term definitions are provided for purposes of example only and are not intended to be construed as limiting on the scope of the claims.

As used herein, the terms "photograph" and "photo" refer to images captured in a persistent form, such as digital photos captured digitally and/or stored in digital form, analog photos captured and converted into digital form, and so forth.

As used herein, the term "location" refers to a geographic location and/or a logical representation of a geographical location and is representable in different ways, such as using geographic coordinates (e.g., Global Positioning System (GPS) coordinates), location proper name (e.g., a country, state, province, etc.), a landmark name (e.g., Taj Mahal, Eiffel Tower, etc.), and so on.

As used herein, the terms "photo cluster" and "location cluster" refer to sets of photographs identified as being captured in proximity to a specific location. For instance, photographs are associated with data (e.g., metadata) that indicates locations at which the photographs were captured, and thus photographs captured within a certain proximity to a specific location are able to be grouped together in a photo cluster and/or a location cluster.

As used herein, "attributes" of photographs refers to conditions that pertain to photo capture as well as visual content of the photographs. For instance, photo attributes include camera settings and camera equipment used to capture the photo, a location at which the photo was captured, visual objects included in the photo, and so forth.

As used herein, a "vector" refers to a data structure consisting of a collection of elements (e.g., values or variables) that are each identified by at least one array index or key. Generally, attributes of photographs are converted into vectors by defining a vector space for each attribute and then mapping attribute values into the vector space to generate vectors that represent the different attribute values. Example vector spaces and attribute to vector conversions are detailed below.

As used herein, a "discovery suggestion" refers to data that is output to a user to provide photography-related recommendations, such as suggested photography locations, suggested camera settings, suggested camera equipment, and so forth. Discovery suggestions for a particular user are generated in various ways, such as by aggregating photographs with attributes that match photo attributes determined for the particular user, and providing attributes of the aggregated photos to the user.

In the following discussion, an example environment is first described that employs generating the location based photo discovery suggestions described herein. Example procedures are also described which are able to be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ generating location based photo discovery suggestions described herein. The illustrated environment 100 includes a computing device 102 and a photo discovery system 104 that are communicatively coupled, one to another, via a network 106, e.g., the Internet. Computing devices that implement the computing device 102 and photo discovery system 104 are configurable in a variety of ways.

A computing device, for instance, is configurable as a desktop computer, a laptop computer, a mobile device (e.g., assuming a handheld configuration such as a tablet or mobile phone as illustrated), and so forth. Additionally, although a single computing device is shown, in at least one implementation a computing device is representative of a plurality of different devices, such as multiple servers utilized by a business to perform operations "over the cloud" as illustrated for the photo discovery system 104 and as further described in relation to FIG. 10.

The digital medium environment 100 is further illustrated as including a digital camera 108 that is configured to generate a digital image 110. The digital image 110 is illustrated as stored in storage 112, e.g., a computer-readable storage medium, database, and so forth. While the digital camera 108 is depicted as a standalone device separate from the computing device 102, other examples are also contemplated, such as implementation of the digital camera 108 as functionality integrated into the computing device 102.

The computing device 102 includes a photo discovery module 112 which is representative of functionality implemented at least partially in hardware of the computing device 102 to generate discovery suggestions 112 usable to guide a user in capturing the digital image 110. In the illustrated example, the photo discovery module 112 is configured to communicate with a discovery manager module 116 of the photo discovery system 104. As discussed in detail below, the discovery manager module 116 is representative of functionality implemented at least partially in hardware of the photo discovery system 104 to provide photo discovery data 118 based on various contextual data, such as types of images typically captured by a user of the digital camera 108, specific geographic locations available for image capture, image capture settings utilized by the digital camera 108, and so forth. Although illustrated as implemented remotely via the network 106, functionality of the photo discovery system 104 and/or discovery manager module 116 is also able to be implemented in whole or in part locally by the computing device 102.

The computing device 102 further includes a camera interface module 120 which is representative of functionality implemented at least partially in hardware of the computing device 102 to interface with a device interface module 122 of the digital camera 108. In at least one implementation, communication between the camera interface module 120 and the device interface module 122 is implemented via a direct wireless and/or wired connection between the computing device 102 and the digital camera 108. For instance, a direct wireless connection is be established between the digital camera 108 and the computing device 102 using any suitable wireless protocol, such as Bluetooth®, WiFi Direct, Near-Field-Communication (NFC), and so forth. Generally, various types of data are communicable between the camera interface module 120 and the device interface module 122, such as digital images, camera settings, location information, environmental conditions, and so forth. As further detailed below, these different types of data are useful for various purposes, such as generating and/or refining the photo discovery data 118 to generate the discovery suggestions 112.

In this particular example, a particular discovery suggestion 114 guides a user of the digital camera 108 as to an estimated "best" location at which to capture the digital image 110 of an image scene 124. For instance, based on image capture history for the user, a current and/or planned location for the user, and attributes of other photos captured at the location, the discovery suggestion 114 identifies a location of the image scene 124 as a location candidate for capturing the digital image 110. In at least one implementation, the discovery suggestion 114 includes other pertinent information, such as identifiers for popular landmarks at the location, popular times of day for photography at the location, suggested camera settings for capturing digital images at the location, and so forth.

In this way, the discovery suggestion 114 generated from the photo discovery data 118 is able to expand a user's insight into how to best capture a visually pleasing digital image 110 and thus improve operational efficiency of the digital camera 108 to capture visually pleasing images. Consequently, computational, memory, and battery resources of the digital camera 108 are conserved by enabling the user to avoid capturing images that are not of interest to the user.

In the illustrated example, the digital camera 108 is used to capture the digital image 110 of the image scene 124 including the Taj Mahal 126. The discovery suggestion 114, for instance, guides the user to navigate to a position at which the Taj Mahal is located. In at least one implementation, the discovery suggestion 114 also includes other information relevant to capturing a "best" image of the Taj Mahal 126, such as distance from the Taj Mahal that is best for capturing an image, a best capture angle, preferred camera settings, and so forth. In at least one implementation, the discovery suggestion 114 includes image discovery cues that are output via the digital camera 108 and/or the computing device 102, such as visual cues that are output in a display 128 of the computing device 102 and/or a viewfinder 130 of the digital camera 108. Accordingly, techniques for generating location based photo discovery suggestions enable image discovery suggestions to be generated based on user-specific and location-specific information, thus enabling user and system resources to be conserved by avoiding excess resources to be expended in attempting to locate and capture images of interest to a user.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Figure 2A:
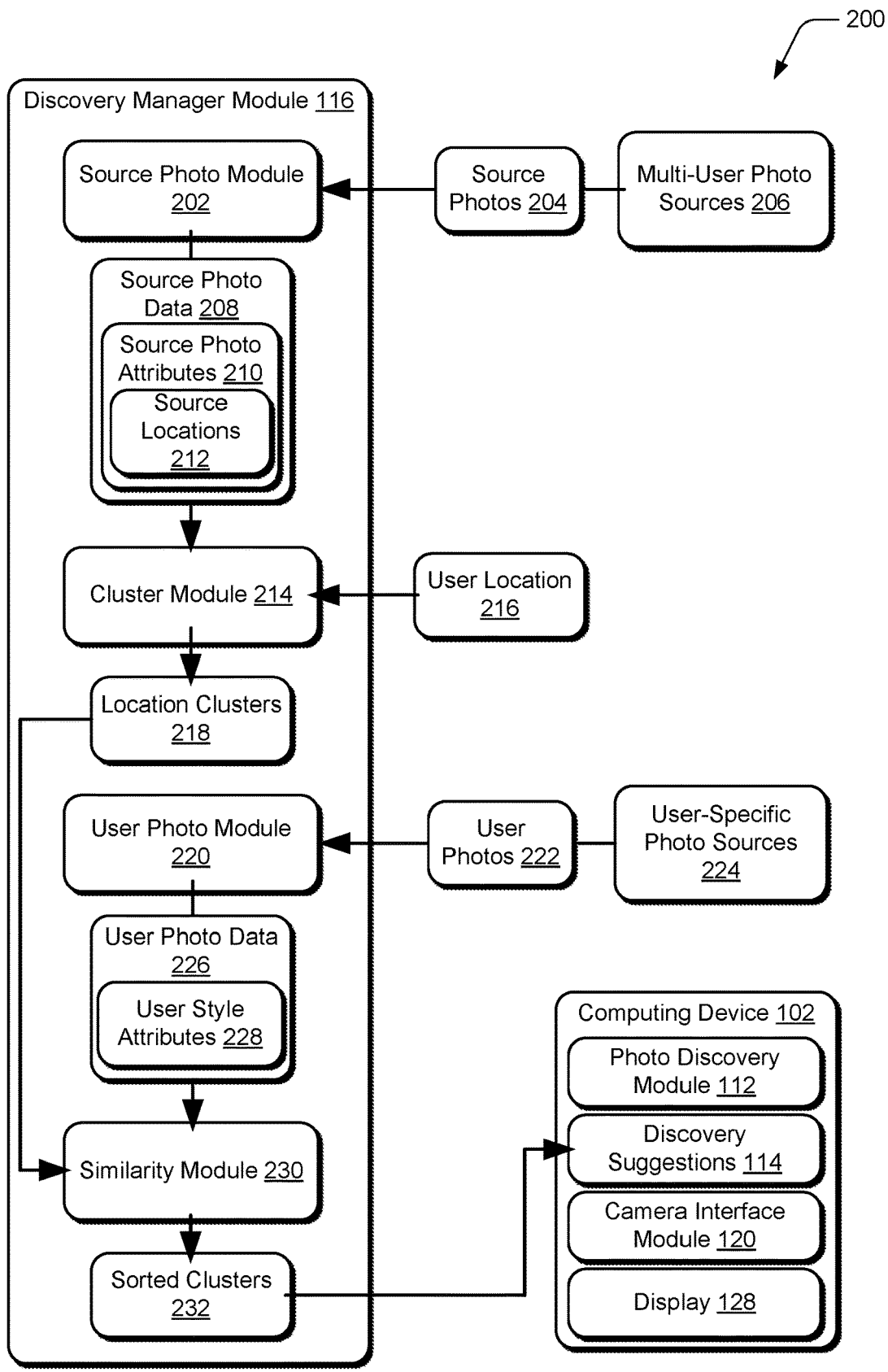
FIG. 2a depicts an example system depicting an example implementation for generating discovery suggestions.

FIG. 2a depicts an example system 200 depicting an example implementation for generating discovery suggestions in accordance with one or more implementations. In the system 200, a source photo module 202 of the discovery manager module 116 receives source photos 204 from multi-user photo sources 206. The multi-user photo sources 206, for example, represent different sources of digital photos captured by different users. Examples of the multi-user photo sources 206 include online photo aggregation locations (e.g., photo sharing websites, public cloud-based photo storage locations, and so forth), user photo storage locations that are made available to the photo discovery system 104 (e.g., with user consent), etc. Accordingly, the source photos 204 generally represent digital photos captured by a variety of different users and at a variety of different geographical locations.

The source photo module 202 processes the source photos 204 and generates source photo data 208, which includes source photo attributes 210 including source photo locations 212. The source photo attributes 210 represent different capture-related attributes of instances of the source photos 204. For example, for particular instances of the source photos 204, the source photo attributes 210 include data such as an author identifier for a user that captured a source photo, capture time and date, camera identifier, lens type/identifier, focal length, exposure setting, film speed (e.g., ISO value), shutter speed, photo tags, and so forth. The source locations 212 identify particular locations (e.g., geographical locations) at which instances of the source photos 204 are captured.

Continuing, a cluster module 214 of the discovery manager module 116 receives the source photo data 208 and user location 216 as input and generates location clusters 218. Generally, the cluster module 214 is representative of functionality to process collections of digital images and to cluster the digital images based on geographical locations and/or digital image attributes. The cluster module 214, for example, identifies source photos 204 that are within a threshold proximity to the user location 216, such as based on a defined radius (e.g., x kilometers) surrounding the user location 216. The cluster module 214 then clusters those source photos 204 that are within the threshold proximity into individual location clusters 218 based on proximity of the identified source photos 204 to each other. For instance, a cluster threshold distance is defined (e.g., y meters) and those source photos 204 that are within the cluster threshold distance are grouped into a particular location cluster 218. Thus, the location clusters 218 include multiple different clusters of source photos 204 that are identified within the threshold proximity to the user location 216. Note that the source photo data 208 is maintained for those source photos 204 that are grouped into the location clusters 218. Further, examples of the user location 216 include a current location of a user (e.g., based on a real-time determination of location of the computing device 102 and/or the digital camera 108), a planned future location of a user such as part of a planned travel itinerary, and so forth.

Further to the system 200, a user photo module 220 of the discovery manager module 116 receives user photos 222 from user-specific photo sources 224, and generates user photo data 226. The user photos 222, for example, represent digital photos captured by a particular user, such as photos associated with a single user identity. Further, the user-specific photo sources 224 represent sources of digital photos captured by the particular user, such as personal photo storage locations, shared photo storage location, photos stored on the computing device 102, and so forth.

Generally, the user photo module 220 represents functionality for extracting various information from the user photos 222, such as a user identifier and user style attributes 228. The user photo module 220, for example, processes the user photo data 226 to determine the user style attributes 228, which represent data that describes typical attributes of the user photos 222. The user style attributes 228, for example, identify common camera settings utilized to capture the user photos 222, such as common lens type/identifier, focal length, exposure setting, film speed (e.g., ISO value), shutter speed, and so forth. In at least one implementation, the user style attributes 228 also identify common visual objects detected in the user photos 222, such as visual objects often captured by the user via the digital camera 108.

Utilizing the user style attributes 228, a similarity module 230 of the discovery manager module 116 determines a similarity of the location clusters 218 to the user style attributes 228 to generate sorted clusters 232. The sorted clusters 232, for example, represents those location clusters 218 that include source photo attributes 210 that are most similar to the user style attributes 228. In at least one implementation, the similarity module 230 ranks the location clusters 218 based on their relative similarity to the user style attributes 228, and selects a top n location clusters 218 to include as part of the sorted clusters 232.

Further to the system 200, the sorted clusters 232 are utilized to generate the discovery suggestions 112, such as by the discovery manager module 116 and/or the photo discovery module 112. The discovery suggestions 112, for example, identify the sorted clusters 232 and provide information about the sorted clusters 232 to provide a user with suggestions regarding locations and visual objects that are determined to be of potential photographic interest to the user.

Figure 2B:
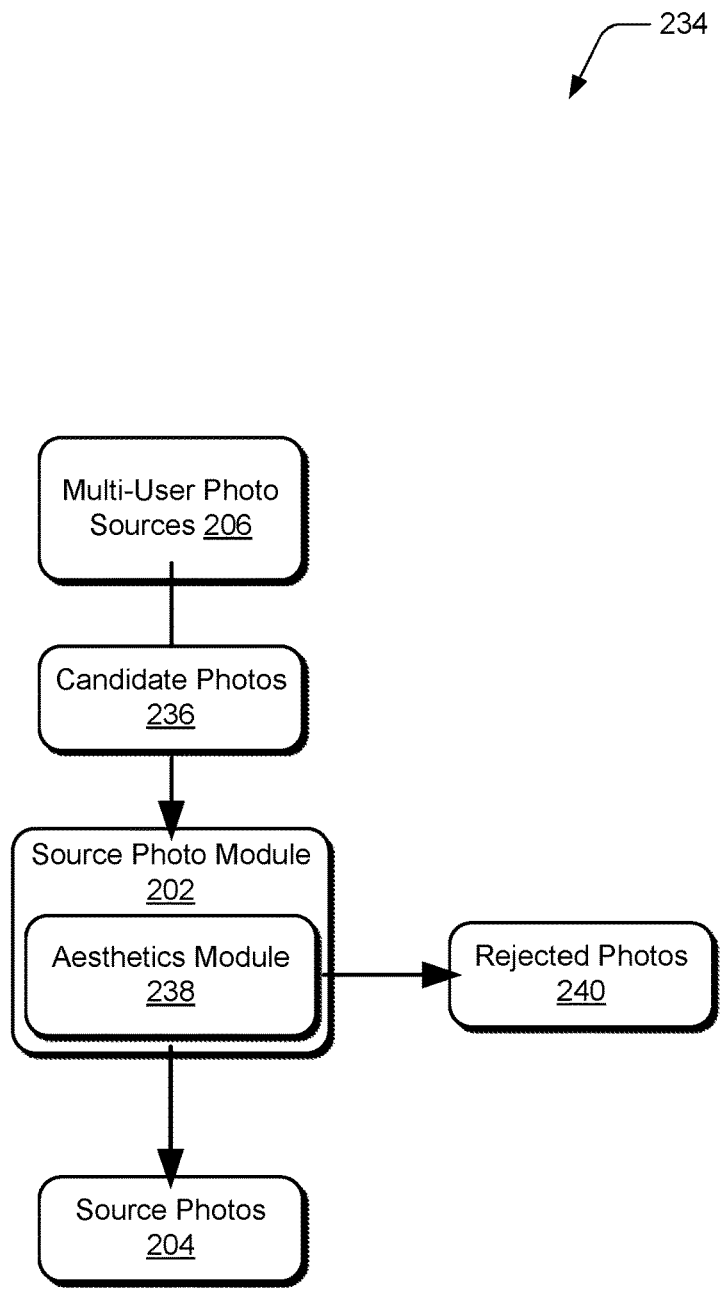
FIG. 2b depicts an example system depicting an example implementation for sorting photos based on aesthetic values.

FIG. 2b depicts an example system 234 depicting an example implementation for sorting photos based on aesthetic values in accordance with one or more implementations. The system 234, for example, represents an extension and/or variation on operation of the source photo module discussed above.

In the system 234, the source photo module 202 receives candidate photos 236. The candidate photos 236, for instance, represent photographs aggregated from the multi-user photo sources 206. An aesthetics module 238 implemented in conjunction with the source photo module 202 filters the candidate photos 236 into different sets of photos including the source photos 204 and rejected photos 240.

The aesthetics module 238, for example, represents functionality for applying aesthetics criteria to the candidate photos 236. The aesthetics module 238, for instance, is representative of functionality to process the candidate source photos and to generate aesthetics scores that characterize visual aesthetics of the candidate photos 236. Generally, as discussed herein "visual aesthetics" refers to ways for digitally characterizing different visual attributes of photos that affect human visual perception of the digital images. Visual aesthetics, for example, are based on different visual factors, such as image quality (e.g., sharpness, noise, contrast, color accuracy, distortion, and so forth), color harmony, depth of field, motion blur, and so on. Thus, the aesthetics module 238 is operable process a candidate photo 236 based on different aesthetics factors to generate an overall aesthetics score for the candidate photo.

In at least one implementation, the source photo module 202 in conjunction with the aesthetics module 238 utilizes a specified aesthetics score threshold to sort the candidate photos 236 into the source photos 204 and the rejected photos 240. For instance, candidate photos 236 with aesthetics scores at or above the aesthetics score threshold are sorted into the source photos 204, whereas candidate photos 236 with aesthetics scores below the threshold are sorted into the rejected photos 240. Generally, the rejected photos 240 are not utilized for further processing, such as for inclusion in generating the location clusters 218.

Figure 2C:
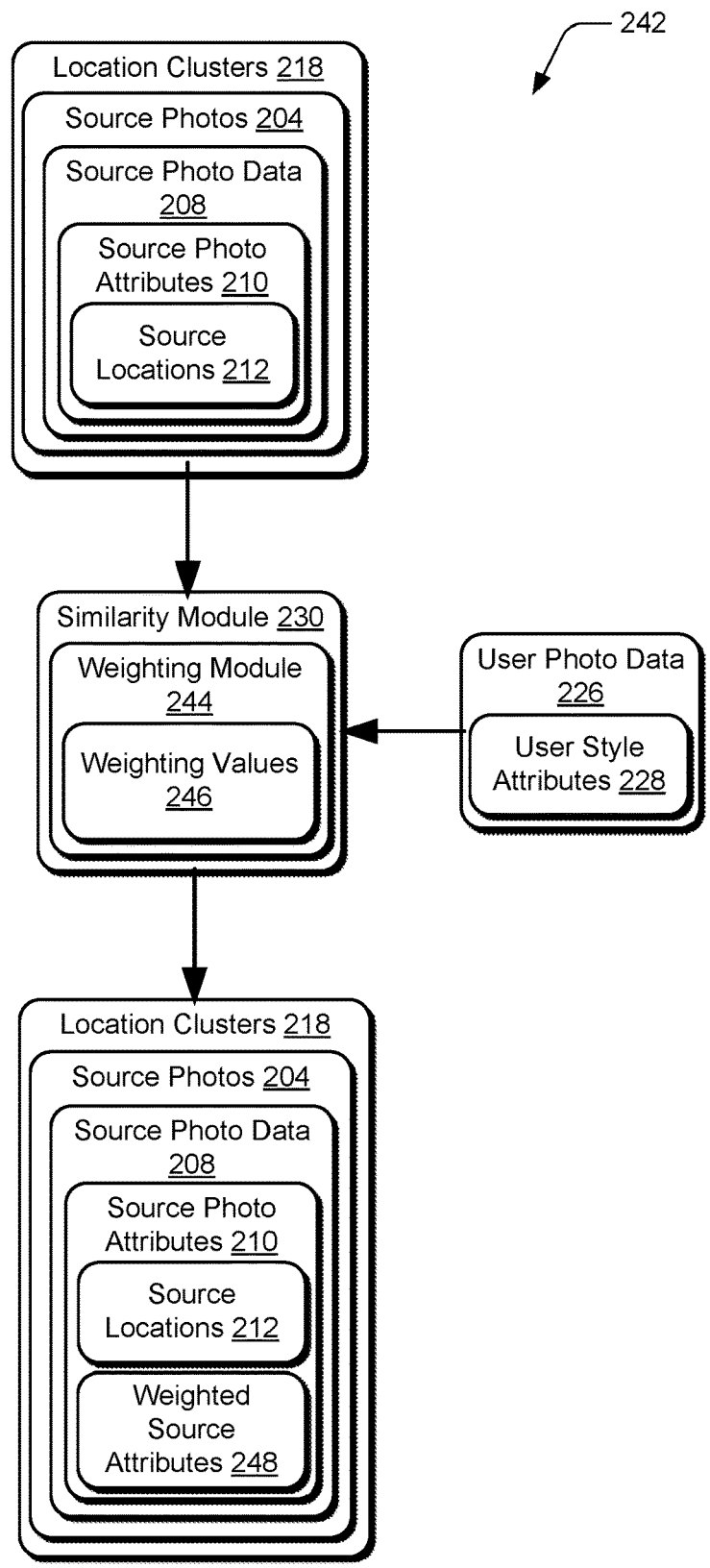
FIG. 2c depicts an example system depicting an example implementation for applying weighting values to photo attributes

FIG. 2c depicts an example system 242 depicting an example implementation for applying weighting values to photo attributes in accordance with one or more implementations. The system 242, for example, represents an extension and/or variation on operation of the similarity module 230 discussed above.

In the system 242, the similarity module 230 includes a weighting module 244 that represents functionality for applying weighting values to specific attributes of photos, examples of which are described throughout this disclosure. The weighting module 244, for example, applies weighting values to the source photo attributes 210 and/or the user style attributes 228. In this particular example, the source photo attributes 210 of the source photos 204 included in the location clusters 218 are processed to apply weighting values 246 to the source photo attributes 210 and generate weighted source attributes 248. In at least some implementations, some source photo attributes 210 are not weighted, whereas different weighting values 246 are applied to others of the source photo attributes 210 to generate the weighted source attributes 248.

Generally, the weighted source attributes 248 are utilized as part of calculating a similarity score between different photo clusters and user photo attributes, such as part of evaluating Equation 4 described below.

Figure 3:
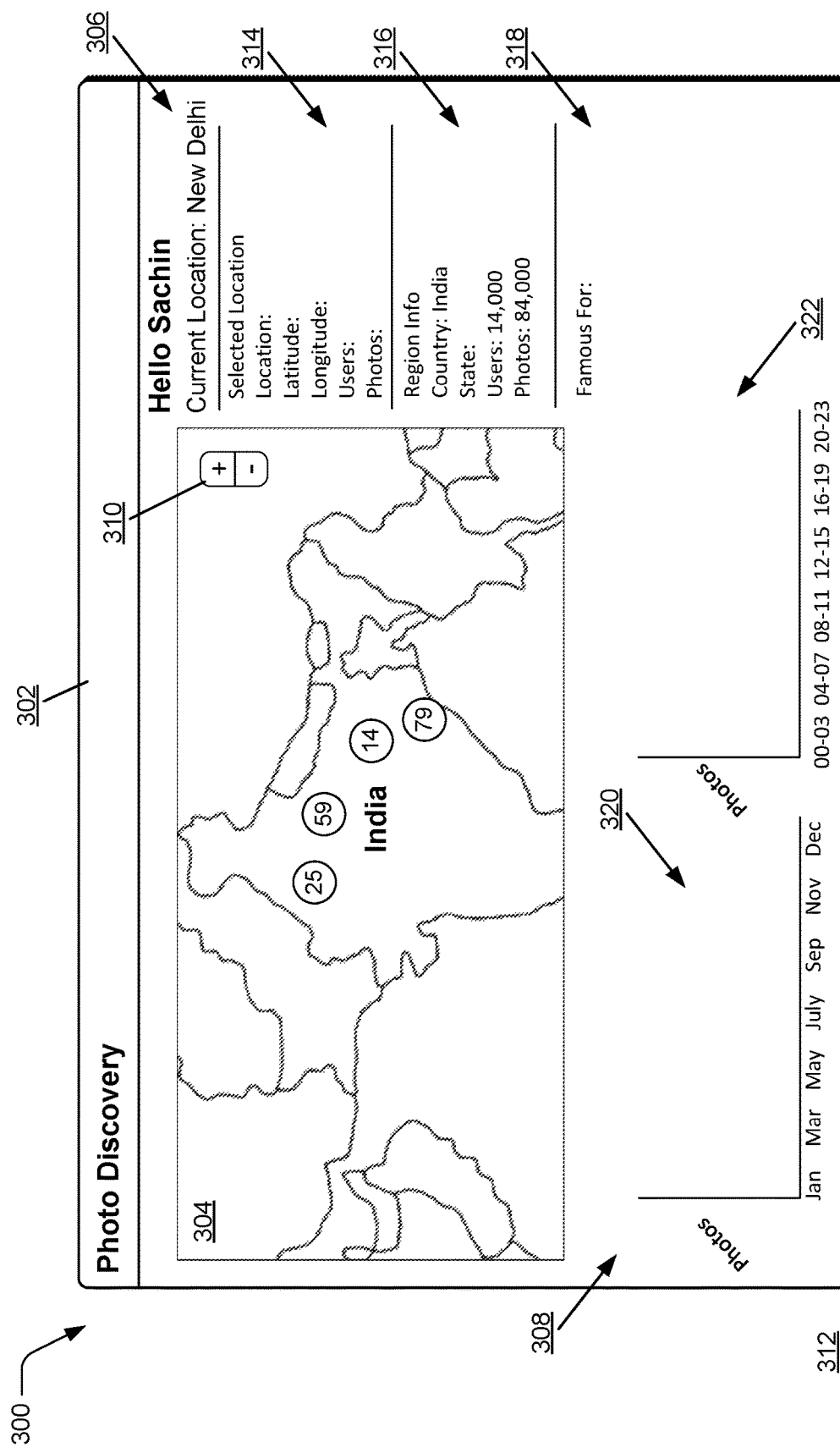
FIG. 3 depicts an example implementation including a discovery graphical user interface (GUI) via which various aspects of techniques for generating location based photo discovery suggestions are implemented.

FIG. 3 depicts an example implementation 300 including a discovery graphical user interface (GUI) 302 via which various aspects of techniques for generating location based photo discovery suggestions are implemented. The discovery GUI 302, for example, is generated by the photo discovery module 112 and/or the discovery manager module 116 and output via the computing device 102.

The discovery GUI 302 includes various regions that output information pertaining to photo discovery as well as receive user input. For instance, the discovery GUI 302 includes a map region 304, an information region 306, and a photo statistics region 308. The map region 304 is configured to display geographical information regarding different geographical regions, such as maps of different regions that are available for capturing photos. The map region 304 includes a zoom control 310, which is configured to receive user input to zoom in and out on geographical regions displayed in the map region 304. Additionally or alternatively to using the zoom control 310, the map region 304 is configured to receive touch input throughout the map region 304 to manipulate displayed geographical regions, such as touch gestures to zoom in and out, pan, and scroll maps displayed in the map region 304.

In this particular example, the map region 304 displays a map of portions of India. Further, the map region 304 includes cluster group indicators 312 overlaid on the map and that represent a visual indication of locations of different photo clusters. Further, the cluster group indicators 312 each include a number that indicates a number of photo clusters located at the respective location. For instance, a particular cluster group indicator 312 includes the number "25" indicating that there are 25 photo clusters located within the particular location of the map displayed in the map region 304. In at least one implementation, each cluster group indicator 312 is configured to receive input to cause additional information about a photo cluster group to be displayed. For instance, selecting a particular cluster group indicator 312 causes an automatic zoom of the map region 304 into a geographical location associated with the particular cluster group indicator 312. Further, the cluster group indicator 312 is replaceable with individual indicators of photo clusters, examples of which are presented in subsequent implementations.

While not expressly depicted in this example, the cluster group indicators 312 are visually configurable to represent a relative number of photo clusters located at a respective cluster group. For instance, a photo cluster threshold of Tc is definable, such as Tc=10 photo clusters. Those locations with a number of photo clusters that meet or exceed Tc are visually differentiated from those with less than Tc, such as by utilizing different colors, sizing, shapes, etc., for the respective cluster group indicators 312.

The information region 306 is configured to display different information about various geographical regions displayed in the map region 304. For instance, the information region 306 includes a selected location section 314 and a region information section 316. The selected location section 314 is configured to display various information about a location that is in focus in the map region 304, such as a particular geographical region and/or cluster group indicator 312 that a user selects. In this particular example there are no specific locations in focus, so the selected location section 314 is unpopulated.

The region information section 316 is configured to display information about a general region displayed in the map region 304. In this particular example, the region information section 316 identifies India and identifies a number of users for which photos within India have been identified (14,000) and a number of photos identified, 84,000. Generally, a location identified in the selected location section 314 represents a subregion of a region identified in the region information section 316.

The information region 306 also includes a tags section 318 which is configured to display different tagged attributes of locations displayed in the map region 304. The tags section 318, for example, identifies commonly photographed objects at particular geographic locations. The tags section 318 is populatable in different ways, such as based on user input to manually identify photographed objects, via tags generated by automated object recognition techniques, etc. In at least one implementation, the tags section 318 is utilized to display information for a location identified in the selected location section 314. Thus, in this example, the tags section 318 is unpopulated.

The photo statistics region 308 in configured to display photo-related statistics for geographical regions presented in the map region 304. In this particular example, the photo statistics region 308 includes a monthly statistics section 320 and a time statistics section 322. The monthly statistics section 320 is configured to present photo statistics for different calendar months, such as a number of photos captured in each month. The monthly statistics section 320, for example, includes a month graph with a y-axis that represents a number of photos (e.g., starting with zero at the origin and increasing upwardly) and an x-axis that represents specific months.

The time statistics region 322 is configured to present photo statistics for particular times of day, such as a number of photos captured at particular times of the day. The time statistics region 322, for example, includes a time graph with a y-axis that represents a number of photos (e.g., starting with zero at the origin and increasing upwardly) and an x-axis that represents different time periods in a 24 hour day. In this particular example, the x-axis is based on a 24 hour clock representation and thus "00-03" represents midnight to 3:00 am, "04-07" represents 4:00 am-7:00 am, and so forth.

In at least one implementation, the photo statistics region 308 is configured to display information about photos for a location identified in the selected location section 314 of the information region 306. Thus, in this particular implementation the photo statistics region 308 is not populated with photo statistics since there are no locations identified in the selected location section 314.

Figure 4:
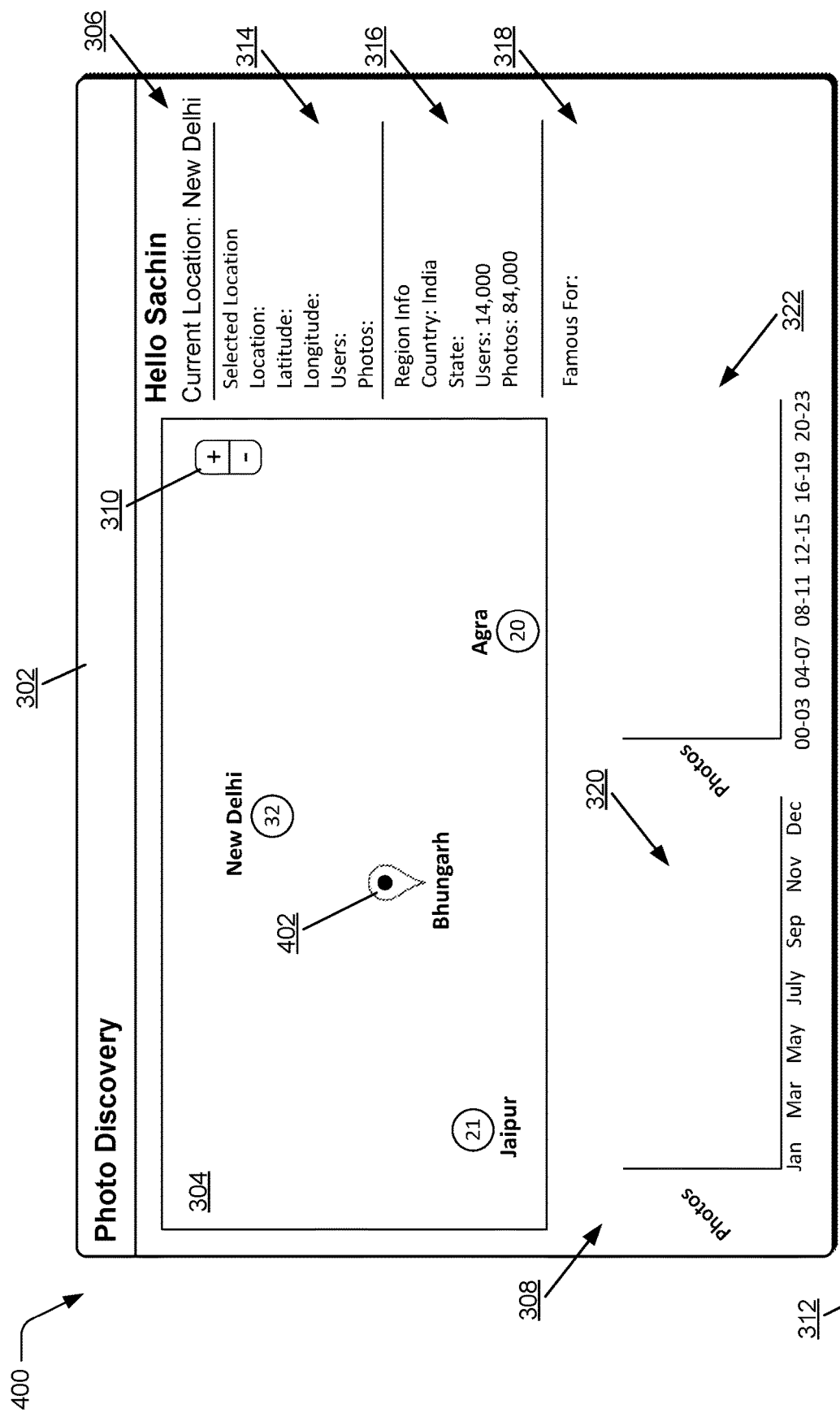
FIG. 4 depicts an example implementation including the discovery GUI and represents a continuation and/or variation on the implementations described in the other figures.

FIG. 4 depicts an example implementation 400 including the discovery GUI 302 and represents a continuation and/or variation on the implementation 300 described above. In the implementation 400, the map presented in the map region 304 is manipulated to present a zoomed in portion of the map presented in the implementation 300, such as based on user input to zoom the map. Accordingly, different cluster group indicators 312 are displayed to identify different photo cluster groups identified in the presented map region. The map region 304 also includes a cluster pin 402 that identifies a specific instance of a photo cluster identified at the village of Bhungarh. The photo cluster, for example, is generated based on identifying a threshold number of photos captured within a threshold proximity to one another.

In this particular implementation there are no specific locations in focus within the map region 304, and thus various information fields within the information region 306 and the photo statistics region 308 are not populated.

Figure 5:
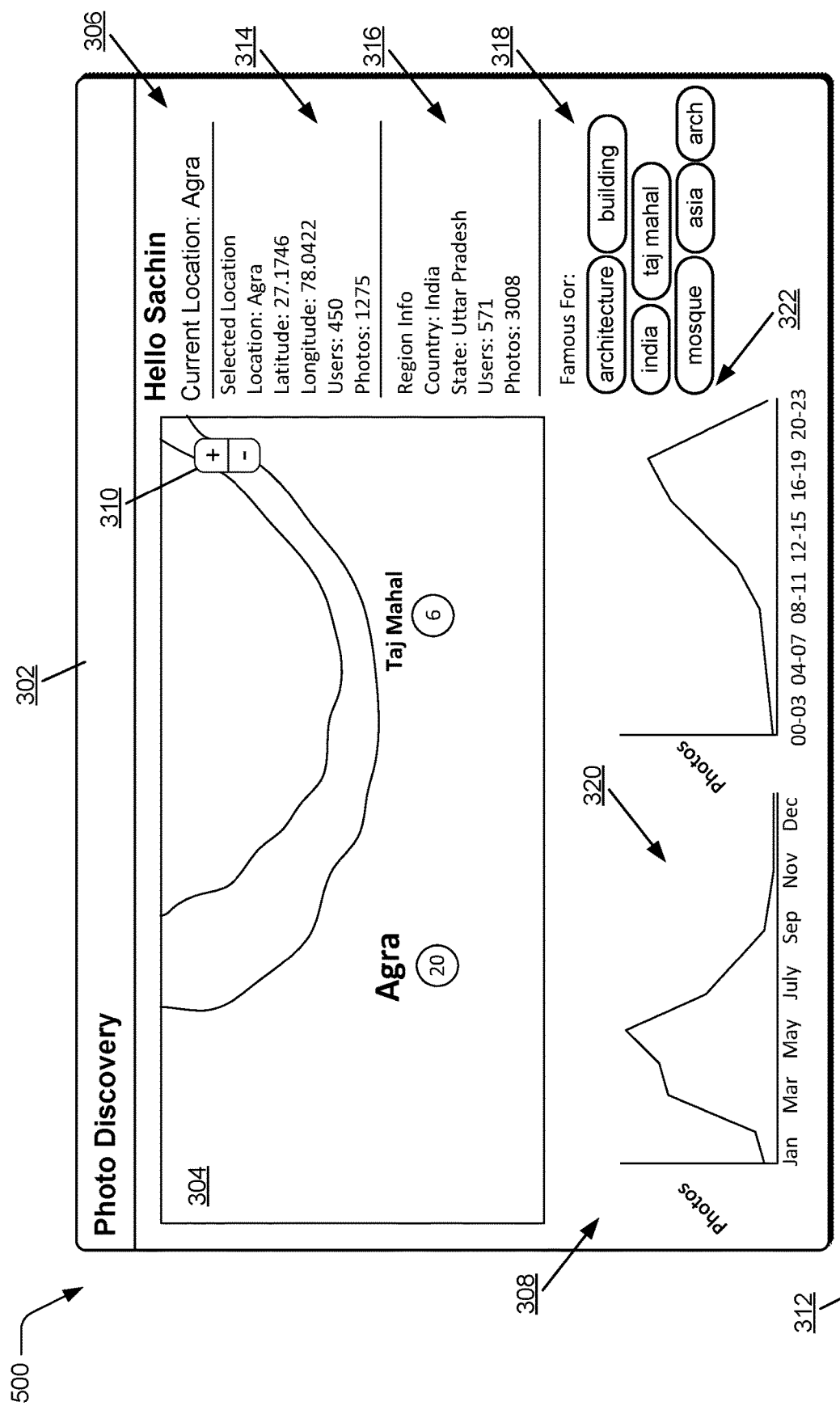
FIG. 5 depicts an example implementation including the discovery GUI and represents a continuation and/or variation on the implementations described in the other figures.

FIG. 5 depicts an example implementation 500 including the discovery GUI 302 and represents a continuation and/or variation on the implementations 300, 400 described above. In the implementation 500, the map presented in the map region 304 is manipulated to present a further zoomed in portion of the map presented in the implementations 300, 400, such as based on user input to zoom the map. The user, for instance, selects a particular location to which to zoom the map region 304. For example, the user selects "Agra" India as a location to which to zoom the map region 304. Accordingly, the map region 304 zooms to the city of Agra.

In this particular example, the city of Agra includes a cluster group indicator 312 indicating that there are 20 photo clusters identified within a threshold proximity to Agra. Further, the Taj Mahal is depicted nearby to Agra, and includes a cluster group indicator 312 indicating that 6 photo clusters are identified within a threshold proximity to the Taj Mahal.

In response to selection and focus on Agra, the information region 306 is populated with various information about this region. For instance, the selected location section 314 identifies the city of Agra as well as latitude and longitude coordinates for this region. Further, the selected location section 314 identifies a number of users that have captured photos in this region (450), as well as a number of photos these users have captured, 1275. In at least one implementation, the users and photos from the selected location section 314 represent sources of the source photos 204 discussed in the system 200.

The region information section 316 is also updated to reflect information about the region in focus within the map region 304. For instance, the "state" field is updated to reflect "Uttar Pradesh," and the users and photos fields are updated to reflect a number of users and photos captured in this region. Additionally, the tags section 318 is updated to reflect popular photographic subjects in this region. For instance, tags generated from various photos captured in this region are identified in the tags section 318. The tags, for example, identify visual objects commonly included in various photos captured in this region.

The photo statistics region 308 is also updated to reflect various statistics for photos captured in this region. For instance, the monthly statistics region 320 is updated to reflect a number of photos (e.g., an average number) captured in various months in this region. In this particular example, the monthly statistics region 320 indicates that March-May is the most popular time of the year to capture photos in this region, with photo capture falling sharply between May-September. The time statistics region 322 is updated to reflect a number of photos (e.g., an average number) captured at various times of the day in this region. In this particular example, the time statistics region 322 indicates that 15:00-19:00 hours is the most popular time period to capture photos in this region.

Figure 6:
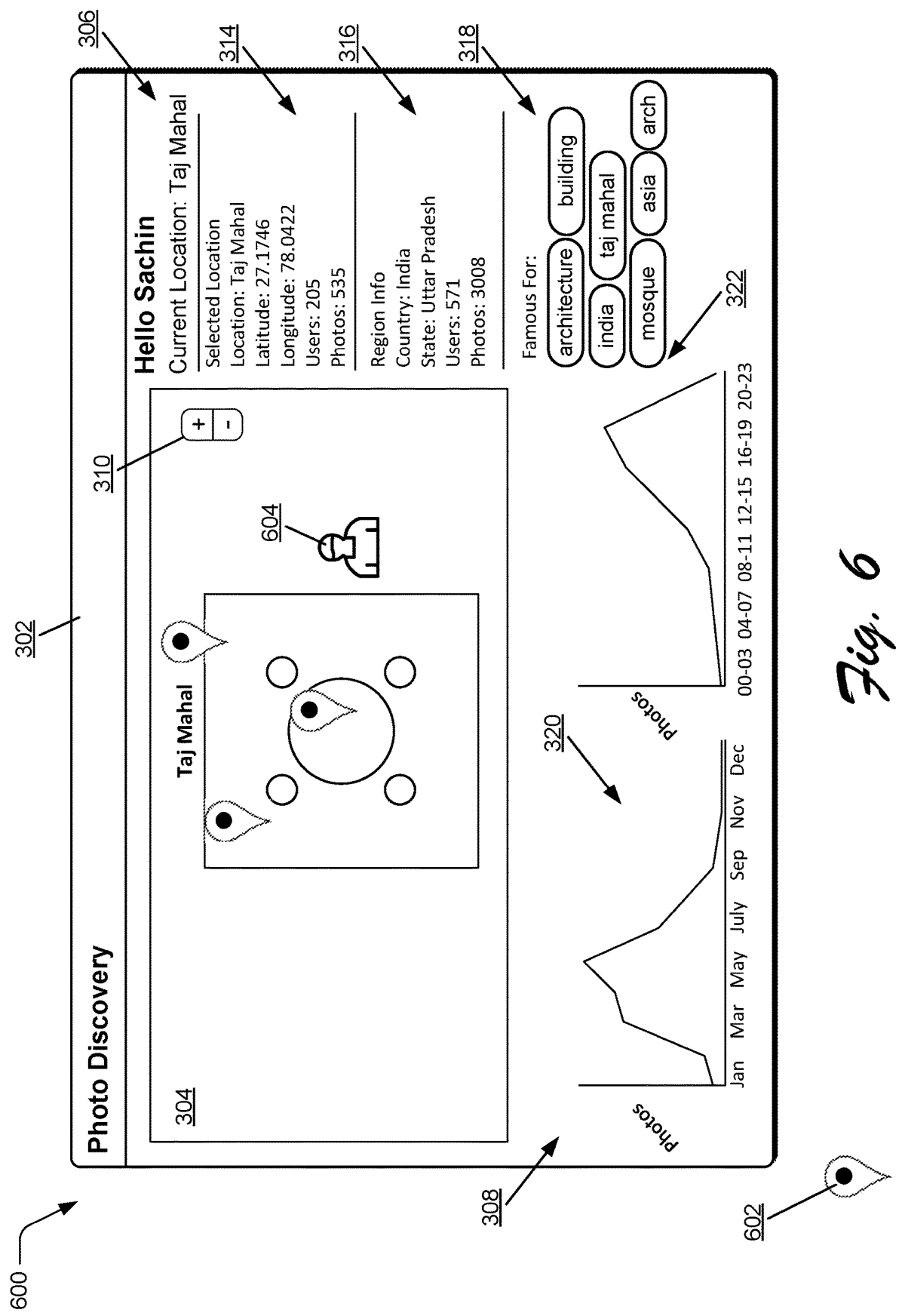
FIG. 6 depicts an example implementation including the discovery GUI and represents a continuation and/or variation on the implementations described in the other figures.

FIG. 6 depicts an example implementation 600 including the discovery GUI 302 and represents a continuation and/or variation on the implementations 300-500 described above. In the implementation 600, the map presented in the map region 304 is manipulated to present a further zoomed in portion of the map presented in the implementation 500, such as based on user input to zoom the map. For example, the user selects the Taj Mahal as a location to which to zoom the map region 304. Accordingly, the map region 304 zooms to a portion of the Taj Mahal.

In additional to depicting a zoomed portion of the Taj Mahal, the map region 304, several cluster pins 602 are presented that represent different photo clusters in proximity to the Taj Mahal. The cluster pins 602, for example, represents some of the photo clusters represented by the cluster group indicator 312 for the Taj Mahal depicted in the implementation 500. Generally, the cluster pins 602 are positioned in popular photography locations around the Taj Mahal, such as locations identified by the cluster module 214 as being associated with at least a threshold number of photo captures. Generally, each cluster pin 602 is selectable to obtain more information about photos captured at a respective location. The selected location section 314 of the information region 306 is also updated to reflect photo-related information for the Taj Mahal, such as to indicate a number of different users detected as capturing photos at the location, and a number of photos captured. The photo statistics indicated in the photo statistics region 308 indicate a generally common set of photo statistics with the location of Agra.

Additionally or alternatively to being based on user interaction with the map region 304 of the discovery GUI 302, the implementation 600 represents a technique for presenting nearby photo discovery recommendations based on user proximity. For instance, the map region 304 includes a user location indicator 604 that represents a current (e.g., real time) location of a user, such as based on determining a location of the computing device 102 in possession of the user. Accordingly, the discovery manager module 116 identifies the location of the user, generates sorted clusters 232 that are within a threshold distance from the location, and the photo discovery module 112 presents the cluster pins 602 to represent the sorted clusters 232. Thus, the cluster pins 602 represent photo clusters that are identified within a threshold proximity to the user and in real time.

Figure 7:
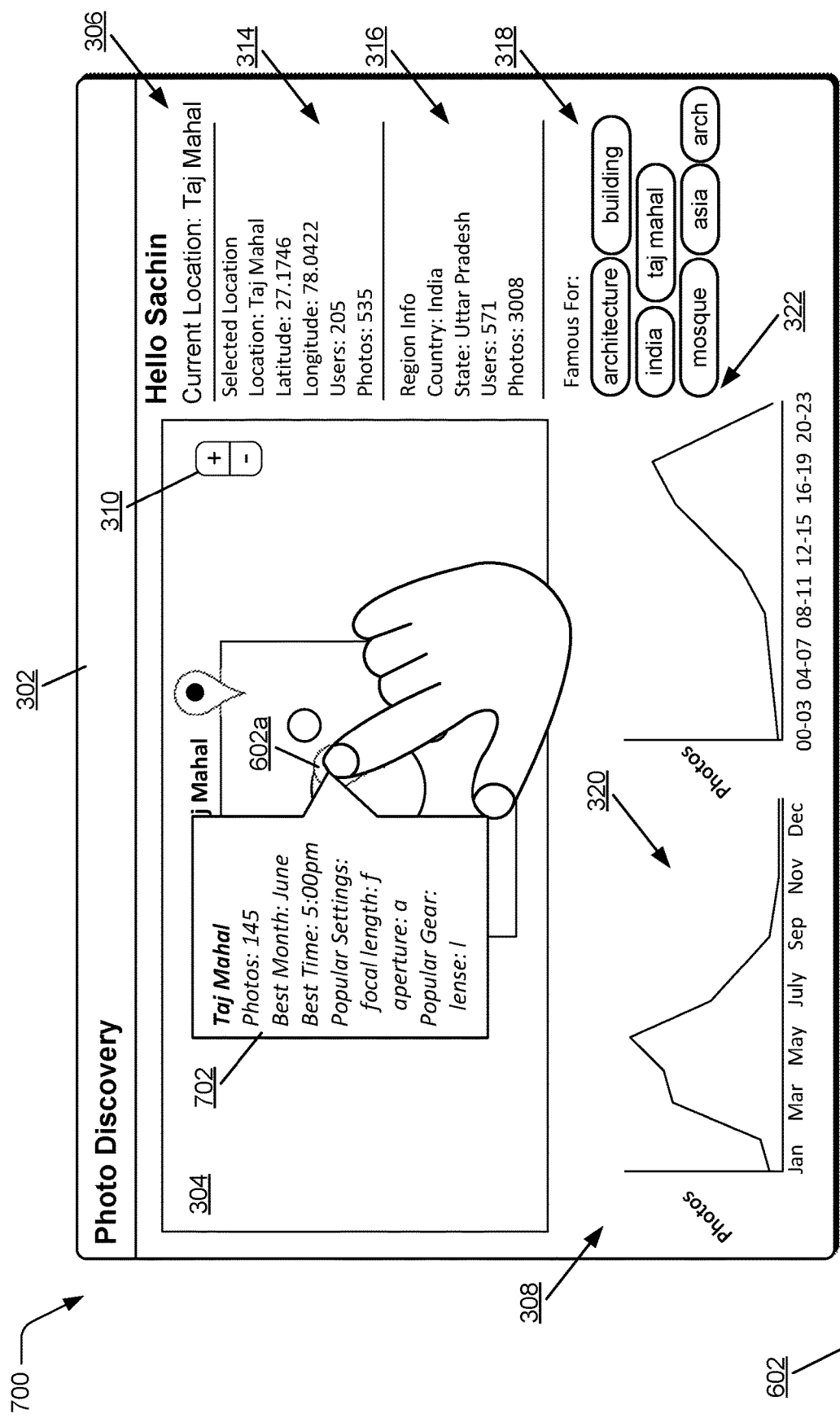
FIG. 7 depicts an example implementation including the discovery GUI and represents a continuation and/or variation on the implementations described in the other figures.

FIG. 7 depicts an example implementation 700 including the discovery GUI 302 and represents a continuation and/or variation on the implementations 300-600 described above. In the implementation 700, a user selects a cluster pin 602a from the displayed cluster pins 602. In response to selection of the cluster pin 602a, the photo discovery module 112 presents a message box 702 that includes photo-related information pertaining to the location associated with the cluster pin 602a. The message box 702, for instance, identifies the location and a number of photos captured at the location, a top month for photo capture, a top time of day for photo capture, popular photo settings utilized at the location, popular photo equipment used at the location, and so forth. In at least one implementation, selecting the cluster pin 602a causes the information region 306 and/or the photo statistics region 308 to be updated to reflect information and statistics for the location associated with the cluster pin 602a. Accordingly, the implementations 300-700 depict various user interfaces and user interactions that are enabled by techniques for generating location based photo discovery suggestions.

Figure 8:
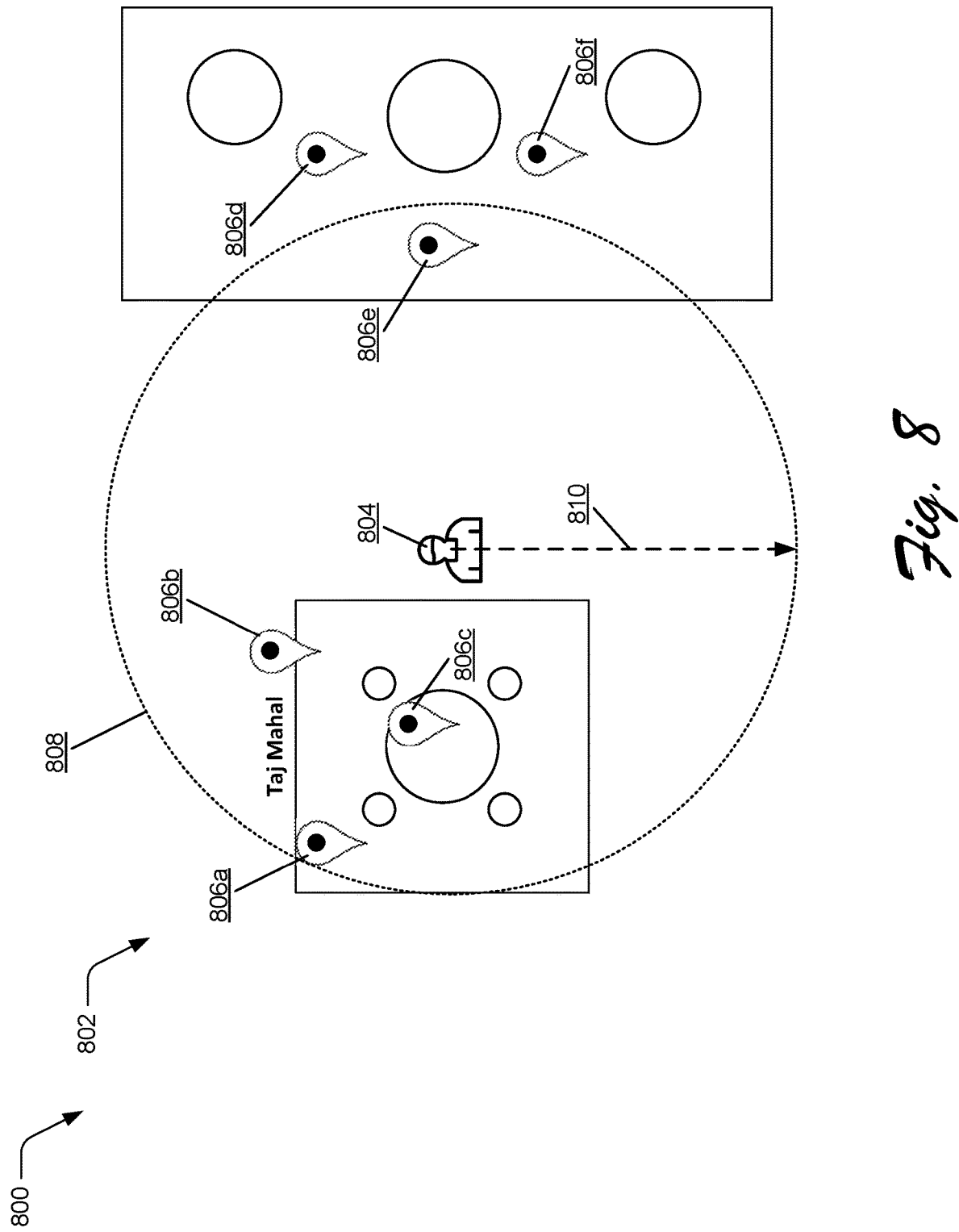
FIG. 8 depicts an implementation for identifying photo clusters to be used for determining which photo clusters to identify to a user.

FIG. 8 depicts an implementation 800 for identifying photo clusters to be used for determining which photo clusters to identify to a user. The implementation includes a geographical location 802 and a user location identifier 804 which indicates a user location within the geographical location 802, such as based on a location of the computing device 102 in possession of the user at the geographical location 802. Further depicted are several photo clusters identified at the geographical location 802, including photo clusters 806a, 806b, 806c, 806d, 806e, 806f.

To determine which photo clusters 806 to evaluate for presentation to a user associated with the user location identifier 804, a proximity area 808 is defined based on the location of the user. The proximity area 808, for example, is defined as a threshold distance from the user, such as based on a circular perimeter defined based on a radius 810. Generally, the radius 810 is definable in different ways, such as utilizing a predefined radius (e.g., as a setting of the discovery manager module 116), a user-configured radius, etc.

Further to the implementation 800, the cluster module 214 identifies those photo clusters 806 that are within the proximity area 808, which in this example includes the photo clusters 806a, 806b, 806c, and 806e. The photo clusters 806a-806c and 806e, for example, represent instances of the location clusters 218 discussed with reference to the system 200. Generally, the photo clusters 806a-806c and 806e are able to be further processed in various ways, such as by determining a similarity of the photo clusters to the user style attributes 228 to generate the sorted clusters 232 and the discovery suggestions 112. Notice that the photo clusters 806d and 806f are outside of the proximity area 808, and thus are not utilized for further processing to provide suggested photo locations to the user.

Example Procedure

The following discussion describes techniques that are implementable utilizing the previously described systems and devices. Aspects of the procedure are able to be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-8.

Figure 9:
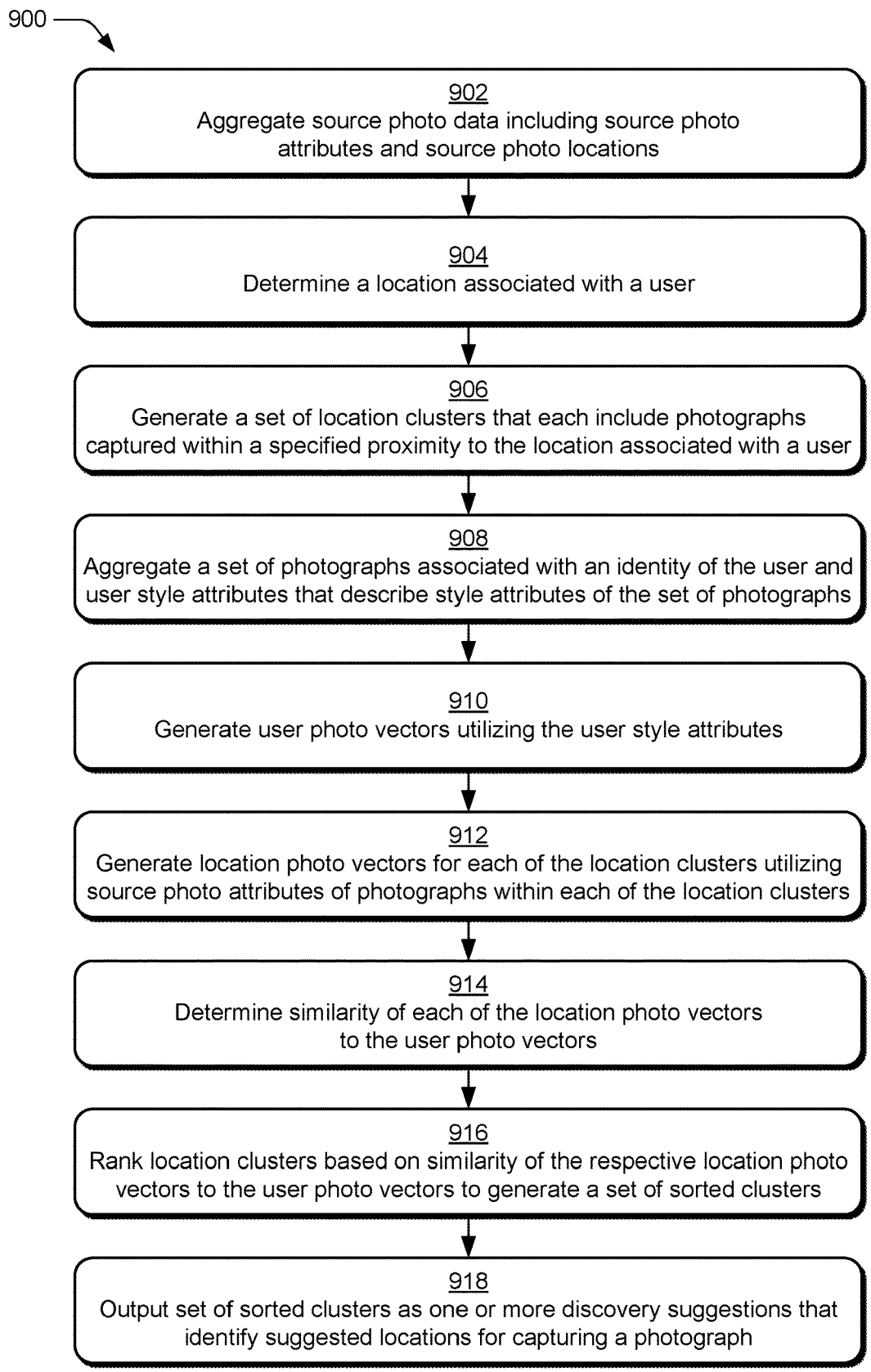
FIG. 9 is a flow diagram depicting a procedure for generating location based photo discovery suggestions.

FIG. 9 depicts a procedure 900 for generating location based photo discovery suggestions in accordance with one or more implementations. Source photo data is aggregated including source photo attributes and source photo locations (block 902). The source photo module 202, for example, aggregates digital photographs captured by different users and from a variety of different sources. Generally, the aggregated photos are captured at a variety of different locations and include data (e.g., metadata) that describes attributes of the photos, such as camera settings, camera equipment descriptions, descriptions of visual objects included in the photos, and so forth. In at least one implementation, the source photos are presorted by location and/or object tags into different groups.

Consider, for example, an attribute table presented below which lists various photo attributes utilized by the techniques described herein:

| Attribute Table | |
| --- | --- |
| Attribute | Description |
| Focal Length | In at least some implementations, higher focal lengths indicate zoom lenses and are used in macro-type photography. Lower focal lengths are typically used for landscapes and street photography. Intermediate photo lengths are utilized for other types of photography, such as portraits. |
| Aperture | Aperture generally determines a depth of field of a photograph. For instance, lower values (e.g., f/1.8, f/2.0, etc.) indicate a shallow depth of field and these values increase as the aperture value increases. Typically, lower aperture values are used for portraits and macro photos whereas the higher aperture values are used for landscapes. |
| Shutter Speed | Shutter speed generally determines how long the shutter is open. Action photography tends to use lower values whereas the blurring motions and astrophotography typically utilize higher values. Portrait photography lies somewhere in between. |
| Tags | Tags describe the visual content of a photograph, such as 'mountain', 'beach', 'family', etc. Tags, for example, represent the description of a photograph in just a few tokens. In at least one implementation, tags are generated using the hashtag2 model. According to the describes techniques, tags are be utilized to identify lexical similarity and semantic similarity between photographs. |
| Capture Time | Capture time specifies a time of day at which a photograph is captured. For instance, some locations are associated with particular times of day at which higher quality photographs are captured. For example, sunset locations are popular between 5pm to 7pm whereas astrophotography hotspots typically have most photographs captured between 12 am and 4 am. |

Attribute Table

| Attribute | Description |
|---|---|
| Photography Gear | This attribute is utilized to determine which photography equipment is most popular at particular locations and/or is utilized to capture highest quality photographs at particular locations. Examples include cameras, lenses, light sources, filters, and so forth. |

A location associated with a user is determined (block 904). The discovery manager module 116, for example, determines a location of the user, such as based on a location of the computing device 102 determined in real time. Alternatively or in addition, the location represents a user-specified location, such as based on user input to identify a location of interest. The user, for example, plans a trip to a particular geographic location and specifies the location for purposes of photography planning. Generally, the location is describable in different ways, such as via location coordinates (e.g., GPS), by description of a geographical location (e.g., country, state, city), description of a landmark (e.g., Eiffel Tower, Taj Mahal, Machu Picchu), and so forth.

A set of location clusters is generated that each include photographs captured within a specified proximity to the location associated with a user (block 906). For instance, the cluster module 214 receives the user location and filters the source photos to identify source photos that are captured within a threshold proximity to the user location. The threshold proximity is definable in different ways, such as a predefined distance perimeter (e.g., n meters) specified by a system setting of the photo discovery system 104, a user-specified proximity, and so forth.

A set of photographs associated with an identity of the user and user style attributes that describe style attributes of the set of photographs are aggregated (block 908). The user photo module 220, for example, aggregates photographs that are associated with a particular (e.g., single) user identity. Further, the user photo module 220 determines user style attributes for the photos, such as camera settings and camera equipment utilized for instances of the photos, dates and times at which the photos were captured, visual objects included in the photos, and so forth. Examples of such attributes are described in the Attribute Table above.

User photo vectors are generated utilizing the user style attributes (block 910). The similarity module 230, for example, generates user photo vectors by converting the user style attributes into vector representations of the style attributes. In at least one implementation, this is performed by converting values for the user style attributes into vector strings that represent each attribute. The example Vector Table below describes example ways for converting photo attributes into vector representations:

Vector Table

| Attribute | Vector Space | Example Input Attributes | Example Output Vector |
|---|---|---|---|
| Focal Length | Divide the complete focal length range in to commonly used sub-ranges, such as:<br>Range 0: 4 mm-15 mm Ultra-wide<br>Range 1: 15 mm-24 mm Wide<br>Range 2: 24 mm-55 mm Close Portrait<br>Range 3: 55 mm-120 mm Portrait<br>Range 4: 120 mm-250 mm Beginner Zoom<br>Range 5: 250 mm-400 mm Zoom<br>Range 6: 400 m-800 Super Zoom<br>Range 7: 800-above | Photos captured at:<br>24 mm: 50<br>50 mm: 20<br>400 mm: 30 | [0, 50, 20, 0, 0, 0, 30, 0] |
| Aperture | Divide the aperture range into sub-ranges:<br>Range 0: f/0.0-f/1.8<br>Range 1: f/1.8-f/2.8<br>Range 2: f/2.8-f/4<br>Range 3: f/4-f/5.6<br>Range 4: f/5.6-f/8<br>Range 5: f/8-f/11<br>Range 6: f/11-f/16<br>Range 7: f/16-f/22 | Photos captured at:<br>f/1.8: 20<br>f/2.2: 30<br>f/7: 50 | [20, 30, 0, 0, 50, 0, 0, 0] |
| Shutter Speed | Divide the shutter speed range into sab-ranges:<br>Range 0: 1/4000-1/2000<br>Range 1: 1/2000-1/1000<br>Range 2: 1/1000-1/250<br>Range 3: 1/250-1/150<br>Range 4: 1/150-1/100<br>Range 5: 1/100-1/15<br>Range 6: 1/15-1/8<br>Range 7: 1/8-¼<br>Range 8: ¼-5 s<br>Range 9: 5-20 s<br>Range 10: 20 s and above | Photos captured at:<br>1/100 s: 50<br>1/60 s: 40<br>2 s: 10 | [0, 0, 0, 0, 0, 90, 0, 0, 10, 0, 0] |
| Tags for Lexical Similarity | To vectorize tags, each index in the vector will represent a single tag and the value at that index will be the frequency of that tag.<br>In at least one implementation, te output is a (1x vocab_size) vector where vocab is the dictionary of available tags. | Frequency of tags in set of photos:<br>"beach": 3<br>"blue": 1<br>"boy": 2<br>"sky": 3 | [0, 3, 1, 2, 0, 3, 0] |

Vector Table

| Attribute | Vector Space | Example Input Attributes | Example Output Vector |
|---|---|---|---|
| | This particular vector is used to compute Lexical Similarity. | In an example implementation consider a small dictionary of just 7 words: (0:apple, 1:beach, 2:blue, 3:boy, 4:cat, 5:sky, 6:zebra) | |
| Tags for Semantic Similarity | To vectorize tags for semantic similarity, a semantic embedding space is utilize, e.g., Global Vectors (GloVe) embeddings. Generally, this enables semantic similarity between two sets of tags to be determined. In at least one implementation, these vectors are implemented as 100 dimensional vectors that are trained on a 400,000 vocabulary size. Generally, an output vector for a particular set of photos (e.g., a set of user photos and/or a location cluster) is represented as (∣ embedding ∣ × ∣ vocab ∣) = (100 × 400k) The output vectors are averaged across a set of tags and transposed to generate a vector of shape (1 × ∣ embedding ∣) = (1 × 100). | Frequency of tags in set of photos: "sky": 3 "blue": 1 "beach": 3 "boy": 2 Consider also that $e_w$ represents embedding for a tag word 'w'. | Semantic Embedding: [0, $e_{beach}$, $e_{blue}$, $e_{boy}$, 0, $e_{sky}$, 0] Frequency Vector (same as above row): [0, 3, 1, 2, 0, 3, 0] Final Vector, $A_{GloVe\_AVG}^T$ = [$x_1, x_2, x_3, \ldots, x_{100}$] |
| Capture Time | Divided into intervals of 3 hours. Total 8 sub-ranges. Range 0: 00-03 Range 1: 03-06 Range 2: 06-09 Range 3: 09-12 Range 4: 12-15 Range 5: 15-18 Range 6: 18-21 Range 7: 21-24 | Photos captured at: 7 am: 30 10 am: 40 6:30 pm: 30 | [0, 0, 30, 40, 0, 0, 30, ] |
| Photography Gear | | | |

In the Vector Table, the "Attributes" column includes different photo attributes, the "Vector Space" column describes example ways for describing the attributes in vector form, the "Sample Input" column includes an example attribute input to be converted to vector form, and the "Output Vector" column includes an example vectorization of the example attribute input using the vectorization methods described in the "Vector Space" column.

As an example, consider for the "focal length" attribute that out of a set of 100 user photos from the user photos 222, 50 are captured at a focal length of 24 mm, 20 are captured at 50 mm, and 30 are captured at 400 mm Utilizing the focal length vectorization method described in the Vector Table, the set of focal length values are represented by dividing a typical focal length range into sub-ranges and then assigning counts to each of these sub-ranges. In at least one implementation, these sub-ranges are generated based on typical photography conventions. Accordingly, by applying the specified vectorization method, the set of focal length values from the user photos 222 is represented as the focal length vector [0, 50, 20, 0, 0, 0, 30, 0].

Location photo vectors for each of the location clusters are generated utilizing source photo attributes of photographs within each of the location clusters (block 912). The similarity module 230, for example, converts source photo attributes into vector form, such as utilizing the vectorization methods described in the Vector Table. Thus, each photo in each location cluster is representable as a set of attribute vectors that represent vectorizations of photo attributes.

Similarity of each of the location photo vectors to the user photo vectors is determined (block 914). The similarity module 230, for example, compares the location photo vectors for each of the location clusters to the user photo vectors. Generally, this involves comparing vectors for corresponding attributes, such as attributes described in the Attribute Table.

In at least one implementation, determining similarity includes calculating a compatibility score between each location cluster and user photo data based on their respective vector representations. For instance, a cosine distance is calculated for a set of attribute vectors and then a weighted sum of the distances is utilized as a compatibility score that indicates similarity. One example way for calculating cosine distance utilizes the equation:

$$cosineDistance(A, B) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \qquad \text{Equation 1}$$

In equation 1, A refers to an attribute vector for a user photo attribute, B refers to an attribute vector for a corresponding source photo attribute, and n is the vector dimension value.

In an example implementation, consider a calculation for comparing focal length similarity. For instance, compare a user photo focal length vector A of [0,50,20,0,0,0,30,0] to a source photo focal length vector B of [0,20,60,20,0,0,0,0]:

$$\text{similarity}(A, B) = \frac{\sum_{i=1}^{8} A_i B_i}{\sqrt{\sum_{i=1}^{8} A_i^2} \sqrt{\sum_{i=1}^{8} B_i^2}} = \frac{2200}{61.64 * 66.33} = 0.538 \qquad \text{Equation 2}$$

Accordingly, using this technique, similarity scores are calculated across corresponding photo attributes of location clusters and for the various photo attributes described herein. However, in at least one implementation, semantic similarity between location cluster photo tags and user photo tags is calculated using a different technique.

For instance, semantic similarity detects similarity between tags that is typically missed by lexical similarity alone. For example, consider that a user photo includes a tag attribute of {beach, boy} and a source photo includes a tag attribute of {man, seaside}. A purely lexical comparison will typically find little to no similarity between these tags, but a semantic comparison reveals a greater degree of similarity.

As described in the Vector Table, tag comparison for semantic similarity is determinable using a semantic embedding space such as the Global Vector (GloVe) embeddings. Consider, for example, the tags described in the "Tags for Semantic Similarity" row of the Vector Table that include the semantic embedding of [0, $e_{beach}$, $e_{blue}$, $e_{boy}$, 0, $e_{sky}$, 0]. To represent each embedding as a 100-dimensional vector, a vector of shape (|embedding|×|vocab|) is generated, for example:

$$A_{GloVe} = \begin{bmatrix} 0 & 10 & 1 & 2 & 0 & 4 & 0 \\ 0 & 12 & 12 & 7 & 0 & 11 & 0 \\ \ldots & \ldots & \ldots & \ldots & \ldots & \ldots & \ldots \\ \ldots & \ldots & \ldots & \ldots & \ldots & \ldots & \ldots \\ 0 & 21 & 4 & 16 & 0 & 5 & 0 \end{bmatrix}$$

In this vector representation, each column represents a 100-dimensional vector for a corresponding tag from the semantic embedding described above. For instance, the second column represents the "beach" tag, the third column "blue," the fourth column "boy," and the sixth column "sky." Since the other columns represent dictionary words that are not found in corresponding tags, these columns have a value of zero. Accordingly, by averaging each column and performing a transpose operation, the vector representation above is transformed into the vector [2.42 6 . . . 6.57]. Utilizing this representation, semantic similarity between user photo tags and source photo tags is calculatable using the cosine similarity technique described above.

In at least one implementation, not all tags are given equal weight in determining semantic similarity between different groups of photos. For instance, for each tag, a frequency vector that describes the frequency of dictionary terms in a set of tags (e.g., the vector [0, 3, 1, 2, 0, 3, 0] described in the "Tags for Semantic Similarity" column of the Vector Table) is further processed to weight the vector for purposes of determining tag similarity. In at least one implementation, this is done by calculating a term frequency-inverse document frequency (TF-IDF) across tags for a set of tags. One example way for calculating TF-IDF uses the equation:

$$A^T_{GloVe_{AVG}} = \frac{\sum_{i=0}^{|vocab|} e^i * t_i^T}{|vocab|}, \text{ where} \qquad \text{Equation 3}$$

-continued $e_i$: embedding for tag at index $i$ $t_i$: tf-idf score for tag at index $i$ vocab: size of tag vocabulary Accordingly, an overall similarity score is generated by summing the similarity scores for each of the attributes of a photo cluster. One example way for calculating an overall similarity score utilizes the equation:

$$\text{similarity}(U, G) = \qquad \text{Equation 4}$$
$$\Sigma W_{attribute} * cosineDistance(U_{attribute}, G_{attribute}),$$

where $U$ = user photo attributes $G$ = source photo/location cluster photo attributes $W$ = attribute weighting Generally, different attribute weighting values W are applicable to attributes to affect an amount of impact that the attributes have on an overall similarity score. For instance, empirical evaluations have demonstrated that a weighting value of 0.2 for the attribute of tags for semantic similarity provides improved discovery suggestions in contrast with unweighted values. Further, a weighting value of 0.16 provides improved discovery suggestions to the attributes of focal length, aperture, shutter speed, tags for lexical similarity, and capture time, in contrast with unweighted values for these attributes. Weighting values are also user customizable to provide discovery suggestions that are tailored to individual user preferences. For instance, the discovery GUI 302 is configurable to expose an attribute weighting functionality that enables weighting values for the various photo attributes described herein to be customized.

The location clusters are ranked based on similarity of the respective location photo vectors to the user photo vectors to generate a set of sorted clusters (block 916). The similarity module 230, for example, ranks the location clusters based on their respective similarity scores from highest to lowest.

The set of sorted clusters is output as one or more discovery suggestions that identify suggested locations for capturing a photograph (block 918). For instance, the photo discovery module 112 outputs the ranked location clusters in the discovery GUI 302 as instances of the discovery suggestions 112. In at least one implementation, a similarity score threshold is specified such that location clusters with a similarity score below the threshold are not output, e.g., are excluded from the ranked set of location clusters for presentation to a user.

As described above, individual discovery suggestions are output using various visual affordances that are selectable to present information about corresponding photo clusters, such as photo statistics, suggested camera settings, suggested photo equipment, and so forth. In at least one implementation, the procedure described above is performed dynamically to present different discovery suggestions for different locations, such as based on user movement between different locations.

Example System and Device

Figure 10:
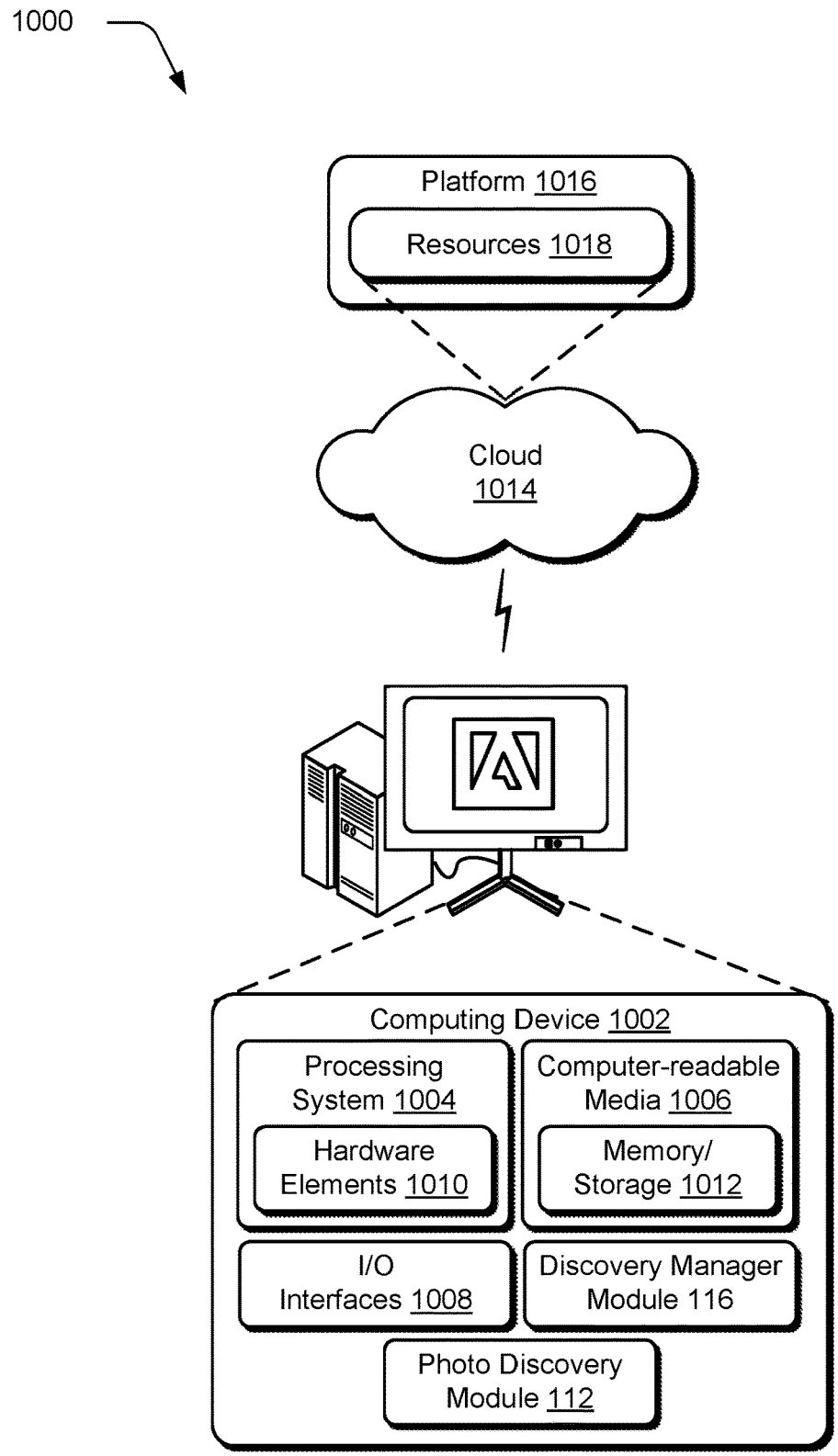
FIG. 10 illustrates an example system including various components of an example device that is implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is demonstrated via inclusion of the photo discovery module 112 and the discovery manager module 116. The computing device 1002, for example, represents a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that are be configured as processors, functional blocks, and so forth. This includes example implementations in hardware as an application specific integrated circuit or other logic device formed using one or more semiconductors. The hardware elements 1010 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1006 is illustrated as including memory/storage 1012. The memory/storage 1012 represents memory/storage capacity associated with one or more computer-readable media. In one example, the memory/storage component 1012 includes volatile media (such as random access memory (RAM)) and/or nonvolatile media (such as read only memory (ROM), Flash memory, optical disks, magnetic disks, and so forth). In another example, the memory/storage component 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1010. For example, the computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supportable by various configurations of the computing device 1002 and are not limited to the specific examples of the techniques described herein. This functionality is also implementable entirely or partially through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. For example, the resources 1018 include applications and/or data that are utilized while computer processing is executed on servers that are remote from the computing device 1002. In some examples, the resources 1018 also include services provided over the Internet and/or through a subscriber network, such as a cellular or Wi-Fi network.

The platform 1016 abstracts the resources 1018 and functions to connect the computing device 1002 with other computing devices. In some examples, the platform 1016 also serves to abstract scaling of resources to provide a corresponding level of scale to encountered demand for the resources that are implemented via the platform. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a discovery suggestion for capturing a photograph, a method implemented by at least one computing device, the method comprising:
   generating, by a cluster module of the at least one computing device, a set of location clusters that each include photographs captured within a specified proximity to a respective geographic location associated with a user, wherein the photographs are captured by multiple different users;
   aggregating, by a user photo module of the at least one computing device, a set of photographs associated with an identity of the user and associated with user style attributes that describe style attributes of the set of photographs, wherein the user style attributes include at least one camera setting associated with the identity of the user;
   generating, by a similarity module of the at least one computing device, a set of sorted clusters that represent the set of location clusters that include source photo attributes that are most similar to the user style attributes, including:
   generating user photo vectors utilizing the user style attributes and generating location photo vectors for each of the location clusters utilizing the source photo attributes of photographs within each of the location clusters; and
   ranking the location clusters based on:
   similarity of the respective location photo vectors to the user photo vectors to generate the set of sorted clusters; and
   a weighting value applied to one or more of the location clusters based on a time value that is generated according to a time during which photographs in the one or more location clusters were captured; and
   outputting, by a photo discovery module of the at least one computing device, the set of sorted clusters as one or more discovery suggestions that identify suggested geographic locations based on the user style attributes within the specified proximity to the respective geographic location associated with the user for capturing a photograph.

2. The method as described in claim 1, wherein the respective geographic location associated with a user comprises a planned future location of the user identified by the user.

3. The method as described in claim 1, wherein said generating the set of location clusters comprises identifying, for at least one of the location cluster, a group of photographs that are captured by the multiple different users within a threshold distance from a particular location.

4. The method as described in claim 1, wherein generating the user photo vectors comprises converting the at least one camera setting into a respective vector representation.

5. The method as described in claim 1, wherein:
   wherein generating the user photo vectors comprises converting each of the at least one camera setting into a respective vector representation;
   the source photo attributes comprise source camera settings identified in the photographs from the location clusters, and wherein said generating the location photo vectors comprises converting each of the source camera settings into a respective vector representation;
   the method further comprising determining, by the similarity module, similarity of the location photo vectors to the user photo vectors by comparing, for each camera setting, a location photo vector to a respective user photo vector.

6. The method as described in claim 1, wherein:
   the user style attributes comprise user object tags identified in the set of photographs associated with the identity of the user, and wherein said generating the user photo vectors comprises converting the user object tags into a vector representation;
   the source photo attributes comprise source object tags identified in the photographs from the location clusters, and wherein said generating the location photo vectors comprises converting the source object tags into a vector representation;

the method further comprising determining, by the similarity module, similarity of the location photo vectors to the user photo vectors by comparing the vector representation of the source object tags to the vector representation of the user object tags.

7. The method as described in claim 6, wherein said determining the similarity of the location photo vectors to the user photo vectors is based on one or more of lexical similarity between the vector representation of the source object tags and the vector representation of the user object tags, or semantic similarity between the vector representation of the source object tags and the vector representation of the user object tags.

8. The method as described in claim 1, wherein the weighting value is specific to a source photo attribute.

9. The method as described in claim 1, further comprising filtering, by an aesthetics module of the at least one computing device, photographs from source photos used to generate one or more of the location clusters to remove one or more photographs that do not correspond to defined aesthetic criteria.

10. The method as described in claim 1, further comprising displaying, on a graphical user interface, a map indicating the suggested geographic locations within the specified proximity to the respective geographic location associated with the user for capturing the photograph.

11. In a digital medium environment to generate a discovery suggestion for capturing a photograph, a system comprising:
    a cluster module implemented at least in part in hardware of at least one computing device to generate a set of location clusters that each include photographs captured within a specified proximity to a respective geographic location associated with a user, wherein the photographs are captured by multiple different users;
    a user photo module implemented in the hardware of at least one computing device to aggregate a set of photos associated with an identity of the user and associated with user style attributes that describe style attributes of the set of photos, wherein the user style attributes include at least one camera setting associated with the identity of the user;
    a similarity module implemented by at least one computing device to:
    generate a set of sorted clusters that represent the set of location clusters that include source photo attributes that are most similar to the user style attributes by generating user photo vectors utilizing the user style attributes;
    generate location photo vectors for each of the location clusters utilizing the source photo attributes of photographs within each of the location clusters; and
    rank the location clusters based on:
    similarity of the respective location photo vectors to the user photo vectors to generate the set of sorted clusters; and
    a weighting value applied to one or more of the location clusters based on a time value that is generated according to a time during which photographs in the one or more location clusters were captured; and
    a photo discovery module implemented in the hardware of at least one computing device to output in a graphical user interface the set of sorted clusters as one or more discovery suggestions that identify suggested geographic locations based on the user style attributes within the specified proximity to the respective geographic location associated with the user for capturing a photograph.

12. The system as described in claim 11, wherein the similarity module is further implemented to generate a similarity score for each location photo vector, and to rank to the location clusters based on their respective similarity scores.

13. The system as described in claim 12, wherein the similarity module is further implemented to exclude a particular location cluster from the sorted clusters based on a similarity score for the particular location cluster being below a similarity score threshold.

14. The system as described in claim 11, wherein the source photo attributes comprise times of day at which the source photos were captured, and where the similarity module is further implemented to rank to the location clusters based on their correspondence to a specified time of day.

15. The system as described in claim 11, wherein the photo discovery module is further implemented by the at least one computing device to output one or more of a most popular time of day or a most popular calendar month for capturing photos at one or more clusters of the set of sorted clusters.

16. The system as described in claim 11, wherein the photo discovery module is further implemented by the at least one computing device to output an estimated time of day corresponding to the user style attributes for capturing photos at one or more clusters of the set of sorted clusters.

17. The system as described in claim 11, wherein the photo discovery module is further implemented by the at least one computing device to output one or more of a suggested camera setting or suggested camera equipment for capturing photos at one or more clusters of the set of sorted clusters.

18. A system for generating a discovery suggestion for capturing a photograph, the system comprising:
    one or more processors; and
    one or more computer-readable storage media storing instructions that are executable by the one or more processors to cause the system to:
    generate user photo vectors utilizing user style attributes from photographs captured by a user, wherein the user style attributes include at least one camera setting associated with an identity of the user;
    generate location photo vectors for location clusters utilizing source photo attributes of photographs within each of the location clusters, wherein the photographs are captured by multiple different users;
    determine a similarity of each of the location photo vectors to the user photo vectors by:
    comparing each of the location photo vectors to the user photo vector;
    determining one or more similarity scores for each of the location photo vectors;
    and applying a weighting value to one or more of the similarity scores based on a time value that is generated according to a time during which photographs in the location clusters were captured; and
    generate one or more discovery suggestions utilizing one or more location clusters with location photo vectors that are most similar to the user photo vector, wherein the one or more discovery suggestions identify one or more suggested geographic locations based on the user style attributes within a specified proximity to a respective geographic location associated with the user for capturing a photograph.

19. The system as described in claim 18, wherein the weighting value is based on a weighting value defined for one or more of a user style attribute or a source photo attribute.

20. The system as described in claim 19, wherein the weighting value is determined by the system based on user response to the one or more discovery suggestions based on the user style attribute or the source photo attribute.

* * * * *

UNITED STATES PATENT AND TRADEMARK OFFICE
CERTIFICATE OF CORRECTION

PATENT NO. : 11,645,349 B2
APPLICATION NO. : 17/023196
DATED : May 9, 2023
INVENTOR(S) : Sachin Kumar Saini, Roshan Singh and Ankur Murarka Page 1 of 1

It is certified that error appears in the above-identified patent and that said Letters Patent is hereby corrected as shown below:

In the Claims

Column 24, Line 48, after "converting", delete "each of".

Signed and Sealed this
Twenty-ninth Day of August, 2023

Katherine Kelly Vidal
*Director of the United States Patent and Trademark Office*